US011183073B2

(12) United States Patent
Mozer

(10) Patent No.: US 11,183,073 B2
(45) Date of Patent: Nov. 23, 2021

(54) AIRCRAFT FLIGHT PLAN SYSTEMS

(71) Applicant: American Robotics, Inc., Boston, MA (US)

(72) Inventor: Reese Alexander Mozer, Pittsburgh, PA (US)

(73) Assignee: American Robotics, Marlborough, MA (US)

( * ) Notice: Subject to any disclaimer, the term of this patent is extended or adjusted under 35 U.S.C. 154(b) by 51 days.

(21) Appl. No.: 15/824,995

(22) Filed: Nov. 28, 2017

(65) Prior Publication Data

US 2018/0151080 A1 May 31, 2018

Related U.S. Application Data

(60) Provisional application No. 62/427,612, filed on Nov. 29, 2016.

(51) Int. Cl.
*G08G 5/00* (2006.01)
*B64C 39/02* (2006.01)
*B64D 47/08* (2006.01)

(52) U.S. Cl.
CPC ......... *G08G 5/0039* (2013.01); *B64C 39/024* (2013.01); *B64D 47/08* (2013.01); *G08G 5/0013* (2013.01); *G08G 5/0021* (2013.01); *G08G 5/0026* (2013.01); *G08G 5/0034* (2013.01); *G08G 5/0069* (2013.01); *G08G 5/0091* (2013.01); *B64C 2201/127* (2013.01); *B64C 2201/141* (2013.01); *B64C 2201/146* (2013.01)

(58) Field of Classification Search
CPC .. G08G 5/0039; G08G 5/0034; G08G 5/0069; B64C 39/024; B64C 2201/146; B64D 47/08

See application file for complete search history.

(56) References Cited

U.S. PATENT DOCUMENTS

| 2010/0121574 | A1 | 5/2010 | Ariyur et al. |
| 2016/0214715 | A1* | 7/2016 | Meffert ................. B64C 39/024 |
| 2016/0225263 | A1* | 8/2016 | Salentiny ............... G08G 5/003 |
| 2017/0205826 | A1* | 7/2017 | Smith .................. G05D 1/0094 |
| 2017/0235308 | A1* | 8/2017 | Gordon ................. B64C 39/024 701/2 |
| 2018/0109767 | A1* | 4/2018 | Li ...................... H04N 5/23206 |

FOREIGN PATENT DOCUMENTS

| EP | 2177966 A2 | 4/2010 |
| WO | 2016029054 A1 | 2/2016 |

OTHER PUBLICATIONS

Extended European search report issued in corresponding EP application No. 17875191.3, dated May 29, 2020.

* cited by examiner

*Primary Examiner* — Michael D Lang
(74) *Attorney, Agent, or Firm* — Locke Lord LLP; Daniel J. Fiorello

(57) ABSTRACT

In accordance with at least one aspect of this disclosure, a computer implemented method includes receiving imaging data from an imaging system of an aircraft, and creating a new flight plan or a modified flight plan of the aircraft based on the imaging data. The method can include transmitting the new flight plan or the modified flight plan to a control system of the aircraft.

17 Claims, 1 Drawing Sheet

AIRCRAFT FLIGHT PLAN SYSTEMS

CROSS-REFERENCE TO RELATED APPLICATIONS

This application claims priority to and the benefit of U.S. Provisional Patent Application No. 62/427,612 filed Nov. 29, 2016, the contents of which are incorporated by reference herein in its entirety.

BACKGROUND

1. Field

The present disclosure relates to aircraft control system, more specifically to flight plan systems for aircraft (e.g., drones).

2. Description of Related Art

Traditional aircraft flight plan systems (e.g., for autonomously/remotely controlled aircraft) require manual creation of flight plans and manual updating of the flight plan software by a pilot operating such a system in the aircraft. In certain systems, drone aircraft can be used to monitor crops, for example, for crop health and/or other characteristics using suitable imaging systems. Such drones can be flown back to base after a flight and provide a user with imaging data. A user can then review imaging data and thereafter decide to fly the drone again to retrieve additional data on one or more areas of interest. However, this process is time consuming, inaccurate, and can lead to missed opportunity.

Such conventional methods and systems have generally been considered satisfactory for their intended purpose. However, there is still a need in the art for improved flight plan systems. The present disclosure provides a solution for this need.

SUMMARY

In accordance with at least one aspect of this disclosure, a computer implemented method includes receiving imaging data from an imaging system of an aircraft, and creating a new flight plan or a modified flight plan of the aircraft based on the imaging data. The method can include transmitting the new flight plan or the modified flight plan to a control system of the aircraft.

Receiving the imaging data can include receiving the imaging data locally on the aircraft. In certain embodiments, receiving the imaging data can include receiving the imaging data at a remote computing device remote from the aircraft.

The method can include receiving location data associated with the imaging data. Creating a new flight plan or a modified flight plan can include determining at least one area of interest from the imaging data and the location data for acquiring additional data. In certain embodiments, creating a new flight plan or a modified flight plan can also include receiving at least one of spatial data, temporal data, weather data, environmental data, aircraft data, monitored subject data, or user preferences, to determine a temporal or spatial component of the new flight plan or modified flight plan.

Creating the new flight plan or modified flight plan can include modifying imaging parameters for the imaging system based on the imaging data. Modifying imaging parameters can include providing at least one of an imaging resolution setting, an imaging type setting, an image zoom setting, or a filtering setting.

Creating a new flight plan or modified flight plan can include using a different sensor type (e.g., a moisture sensor, a temperature sensor, a biological sensor, a different spectral range imaging device). The method can include notifying a pilot of at least one of a new flight plan, a modified flight plan, or a modified imaging parameter.

In accordance with at least one aspect of this disclosure, a drone aircraft can include a controller configured to execute a flight plan, an imaging system configured to create imaging data, and a flight plan module configured to receive the imaging data and create a new flight plan or a modified flight plan of the flight plan being flown by the controller based on the imaging data. The flight plan module can execute any suitable method or portion thereof as disclosed herein.

In accordance with at least one aspect of this disclosure, a non-transitory computer readable medium can include computer executable instructions for executing a method as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
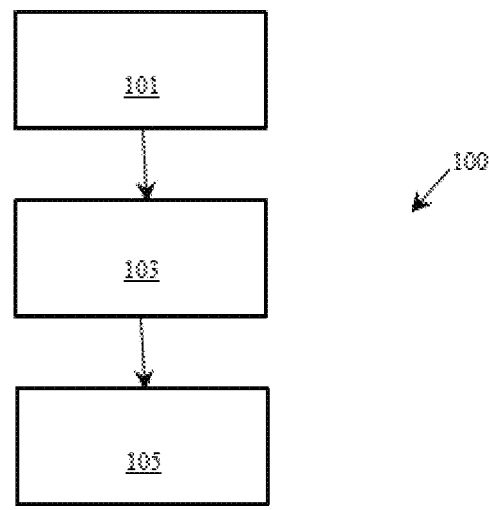
FIG. 1 is a schematic view of an embodiment of a method in accordance with this disclosure.
Figure 2:
FIG. 2 is a schematic view of an embodiment of a drone aircraft in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIG. 2. The systems and methods described herein can be used to dynamically and automatically update flight plans of aircraft in the air as a function of areas of image data (e.g., for monitoring crops more efficiently).

In accordance with at least one aspect of this disclosure, a computer implemented method 100 includes receiving (e.g., at block 101) imaging data (and/or any other suitable sensor data) from an imaging system (and/or any other suitable sensor system) of an aircraft and creating (e.g., at block 103) a new flight plan or a modified flight plan of the aircraft based on the imaging data. The method 100 can include transmitting (e.g., at block 105) the new flight plan or the modified flight plan to a control system (e.g., controller 201 as described below) of the aircraft.

Referring additionally to FIG. 2, a drone aircraft 200 can include a controller 201 configured to execute the flight plan, an imaging system 203 configured to create imaging data, and a flight plan module 205 configured to receive the imaging data and create a new flight plan or a modified flight plan of the flight plan being flown by the controller 201 based on the imaging data. The flight plan module 205 can execute any suitable method (e.g., method 100) or portion thereof as disclosed herein.

The imaging system 203 can include any suitable imaging device or devices, e.g., visual, multispectral and/or hyperspectral sensor (e.g., non-visual spectrum). The imaging devices can be selected based on the intended use of the aircraft (e.g., some applications may need visual and non-visual range imaging systems, or just a single system). In certain embodiments, the aircraft 200 can include any suitable transmitter as appreciated by those in the art configured to communicate with a base station or other suitable remote computing device for transmitting any suitable data (e.g., imaging data).

The controller 201 and/or the flight plan module 205 can include any suitable computer hardware and/or software configured to control the motion of the aircraft 200 (e.g., based on one or more sensors) as appreciated by one having ordinary skill in the art. The flight plan module 205 can be included as part of the controller 201 (e.g., as a software module), or can be a separate module (e.g., a separate circuit), or can be any suitable combination of hardware and software. In certain embodiments, the flight plan module 205 can be embodied off-board of the aircraft 200 (e.g., in a remote computing device, accessible via a communication or internet connection).

Accordingly, in certain embodiments, receiving the imaging data can include receiving the imaging data locally on the aircraft (e.g., at the flight plan module 205 from the imaging system 203). In certain embodiments, receiving the imaging data can include receiving the imaging data at a remote computing device or computing device remote from the aircraft 200.

The flight plan module 205 can be configured with any suitable image or signal processing to determine one or more characteristics of the subject of the image. For example, the flight plan module 205 can use one or more pixels groups to determine a characteristic of crops based on color or intensity of the pixels. For example, certain crops can be darker when ill. Any other suitable image processing is contemplated herein.

In certain embodiments, the method can include receiving location data (e.g., GPS data) associated with the imaging data (e.g., such that each image includes or is associated with a geo-reference tag). Any suitable localization sensor(s) can be utilized (e.g., such as cameras, radar, lidar, sonar, etc.). Creating a new flight plan or a modified flight plan can include determining at least one area of interest (e.g., a damaged or dying crop) from the imaging data and the location data for acquiring additional data.

In certain embodiments, creating a new flight plan or a modified flight plan can include receiving at least one of spatial data, temporal data, weather data, environmental data, aircraft data, monitored subject data, or user preferences, to determine a temporal (e.g., a time period and/or duration of flight) or spatial component (e.g., altitude, attitude, flight pattern, hovering) of the new flight plan or modified flight plan. Creating the new flight plan or modified flight plan can include modifying imaging parameters for the imaging system 203 based on the imaging data. Modifying imaging parameters can include providing at least one of an imaging resolution setting, an imaging type setting, an image zoom setting, or a filtering setting to the imaging system 203. Creating a new flight plan or modified flight plan can include using a different sensor type (e.g., a moisture sensor, a temperature sensor, a biological sensor, a different spectral range imaging device).

The method can include notifying a pilot of at least one of a new flight plan, a modified flight plan, or a modified imaging parameter. Notification can be in any suitable manner (e.g., via mobile application, web application, text message, email, or any other suitable method).

In accordance with at least one aspect of this disclosure, a non-transitory computer readable medium can include computer executable instructions for executing a method as described above.

As will be appreciated by those skilled in the art, aspects of the present disclosure may be embodied as a system, method or computer program product. Accordingly, aspects of the present invention may take the form of an entirely software embodiment (including firmware, resident software, micro-code, etc.), an entirely hardware embodiment, or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

As described above, an aircraft (e.g., a drone) can fly over an area on a preplanned flight path. The drone can be autonomously controlled. Applications includes use over agricultural land (e.g., for monitoring one or more characteristics of crops such as crop health and/or a cause of health problem, livestock, etc.), mining, defined commercial areas (e.g., parking lots, solar panel farms, etc.). Onboard sensors can collect image data. Data, for example, can be related to health of crops/soil, health of livestock/animals, etc.

The flight plan module can interpret the image data and convert it into a new flight plan, e.g., to gather subsequent data. Data can include multiple images, e.g., stitched together to form larger, cohesive image. Any other suitable data is contemplated herein.

The images can be geo-referenced (e.g., GPS tagged). Data from the imaging system can be potentially transferred to secondary computer, such as but not limited to, a separate computer onboard the aircraft (e.g., separate from the controller), a base station, a cloud database, a base station then a cloud database. The data is used by the flight plan module 205 to detect areas of interest, such as, unhealthy regions, changes in health, and/or other potential problems using any suitable image or signal processing. The flight plan module 205 can decide which areas to target for subsequent data, for example, and can create a flight plan to send the aircraft to the areas of interest (e.g., to hover over or revisit/reinterrogate the area of interest and take more imaging data). Spatial and temporal data from previous flights and/or other sources can be used (e.g., weather and environmental data, absolute values, relative values, vehicle parameters, crop type, user input).

In certain embodiments, unhealthy crops can be identified with an imaging sensor, such as a multispectral camera. These unhealthy sections, identified by certain pixel values (e.g. generated by vegetation index algorithms such as Normalized Difference Vegetation Index), can be associated with location data, e.g. GPS location data, visual position data, e.g. Simultaneous Localization and Mapping), odometry measurements, etc.) to identify an area of interest. These locations can be recorded and stored for use in future inspections and subsequent data collection. These locations, e.g., which can be referred to as areas of interest in certain cases, can be further identified, specified, and selected by other parameters such as pixel value thresholds, user input, crop type information, crop growth stage information, historical data, time series data and predictions, machine learning techniques, terrain attributes, weather data and environmental data, vehicle parameters, or any other suitable means.

Subsequent data can be collected to add more information, such as but not limited to more detail, higher resolution, different data type(s) (e.g., visual image, hyperspectral image, chemical sensing), or the cause of a health problem. The flight plan module 205 can automatically create a new and optimized flight path based on targeted areas to gather the subsequent data. In flight, a flight path can be automatically updated and uploaded to the aircraft, for example. In certain embodiments, a new flight schedule can be automatically programmed into a drone aircraft.

In certain embodiments as described above, a new flight path and/or schedule can have characteristics which are better suited to obtain subsequent data, e.g., going to specific spots, regions, fields, flying lower, hovering, flying at a specific date, or flying at specific time of day. The subsequent data collected can be intended to add more information about the area of interest, e.g., not originally detectable in the initial data collection flight, for example.

Embodiments as described above can notify a user/owner of changes to the drone flight path and/or scheduling for example.

The methods and systems of the present disclosure, as described above and shown in the drawings, provide for flight plan systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A computer implemented method, comprising:
   receiving sensor data from a sensor system of an aircraft;
   creating a new flight plan or a modified flight plan of the aircraft at a flight plan module onboard the aircraft based on the sensor data, wherein the sensor system is an imaging system and the sensor data is imaging data from the imaging system, wherein the imaging data include multispectral imaging data; and
   receiving location data associated with the imaging data, wherein creating a new flight plan or a modified flight plan includes:

determining at least one area of interest from the imaging data and the location data for acquiring additional data; and modifying imaging or signal parameters for the imaging system based on the imaging data.

2. The method of claim 1, wherein the imaging data include hyperspectral imaging data.

3. The method of claim 1, further comprising transmitting the new flight plan or the modified flight plan to a control system of the aircraft.

4. The method of claim 1, wherein receiving the imaging data includes receiving the imaging data locally on the aircraft at the flight plan module.

5. The method of claim 1, wherein receiving the imaging data includes receiving the imaging data at a remote computing device remote from the aircraft.

6. The method of claim 1, wherein creating a new flight plan or a modified flight plan includes receiving at least one of spatial data, temporal data, weather data, environmental data, aircraft data, monitored subject data, or user preferences, to determine a temporal or spatial component of the new flight plan or modified flight plan.

7. The method of claim 1, wherein modifying imaging or signal parameters includes providing at least one of an imaging resolution setting, an imaging type setting, an image zoom setting, or a filtering setting.

8. The method of claim 7, further comprising notifying a pilot or user of the drone system of at least one of a new flight plan, a modified flight plan, or a modified imaging parameter.

9. A drone aircraft, comprising:
a controller configured to execute a flight plan;
an imaging system configured to create imaging data; and
a flight plan module configured to perform a method, the method comprising:
receiving the imaging data; and
creating a new flight plan or a modified flight plan of the flight plan being flown by the controller based on the imaging data, wherein creating the new flight plan or the modified flight plan includes modifying imaging or signal parameters for the imaging system based on the imaging data.

10. A non-transitory computer readable medium, comprising computer executable instructions for executing a method, the method comprising:
receiving imaging or signal data from an imaging system of an aircraft;
creating a new flight plan or a modified flight plan of the aircraft based on the imaging data,
wherein creating the new flight plan or the modified flight plan includes modifying imaging or signal parameters for the imaging system based on the imaging data.

11. The non-transitory computer readable medium of claim 10, further comprising transmitting the new flight plan or the modified flight plan to a control system of the aircraft.

12. The non-transitory computer readable medium of claim 10, wherein receiving the imaging or signal data includes receiving the imaging data locally on the aircraft.

13. The non-transitory computer readable medium of claim 10, wherein receiving the imaging data includes receiving the imaging data at a remote computing device remote from the aircraft.

14. The non-transitory computer readable medium of claim 10, further comprising receiving location data associated with the imaging data.

15. The non-transitory computer readable medium of claim 14, wherein creating a new flight plan or a modified flight plan includes determining at least one area of interest from the imaging data and the location data for acquiring additional data.

16. The non-transitory computer readable medium of claim 15, wherein creating a new flight plan or a modified flight plan includes receiving at least one of spatial data, temporal data, weather data, environmental data, aircraft data, monitored subject data, or user preferences, to determine a temporal or spatial component of the new flight plan or modified flight plan.

17. The non-transitory computer readable medium of claim 10, wherein notifying a pilot or user of the drone system of at least one of a new flight plan, a modified flight plan, or a modified imaging parameter.

* * * * *